Dec. 22, 1942.    B. W. KING    2,306,269
RETRACTABLE AND COLLAPSIBLE PONTOON
Filed Jan. 27, 1940    7 Sheets-Sheet 1
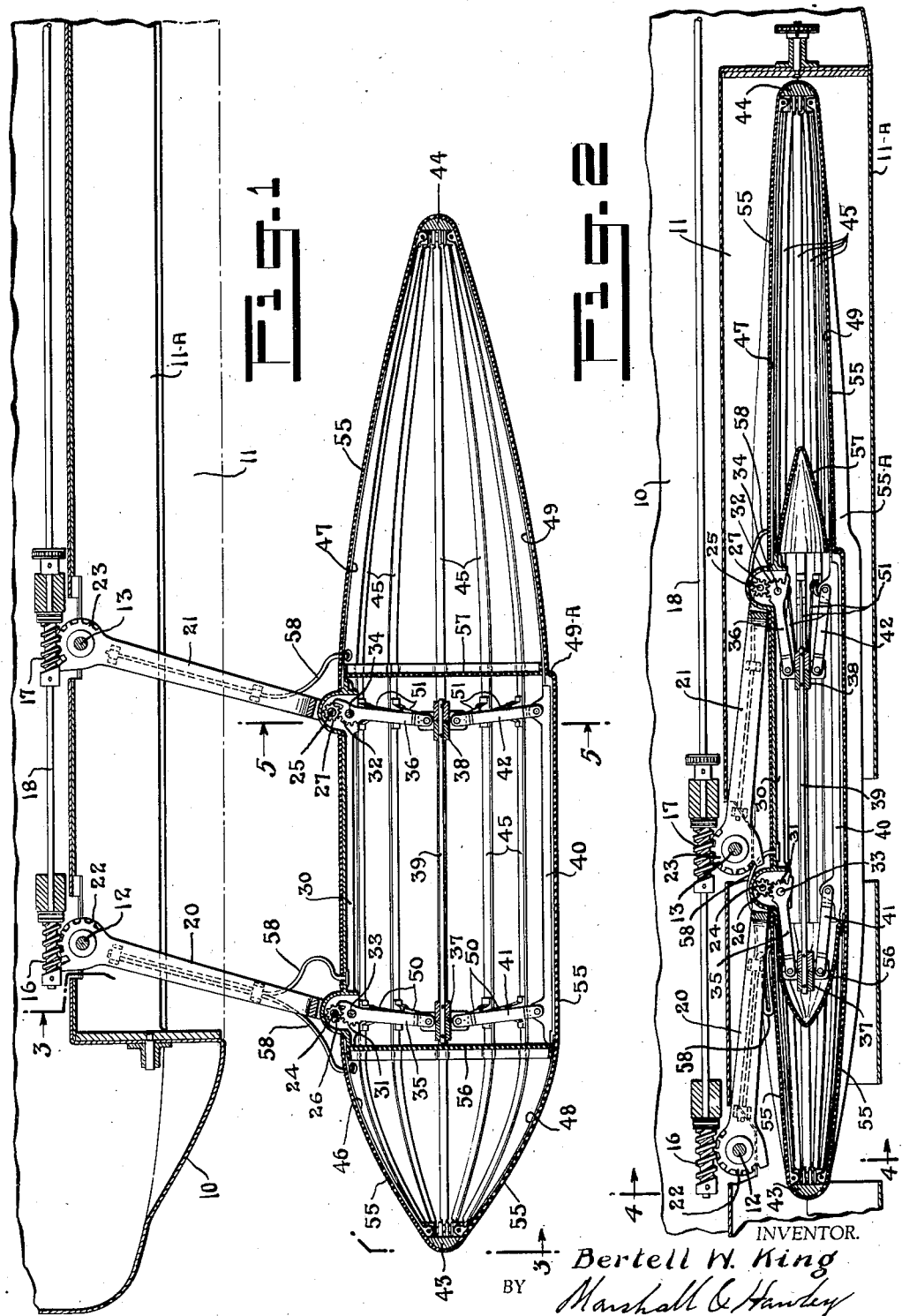
INVENTOR.
Bertell W. King
BY
ATTORNEYS Dec. 22, 1942.   B. W. KING   2,306,269
RETRACTABLE AND COLLAPSIBLE PONTOON
Filed Jan. 27, 1940   7 Sheets-Sheet 2
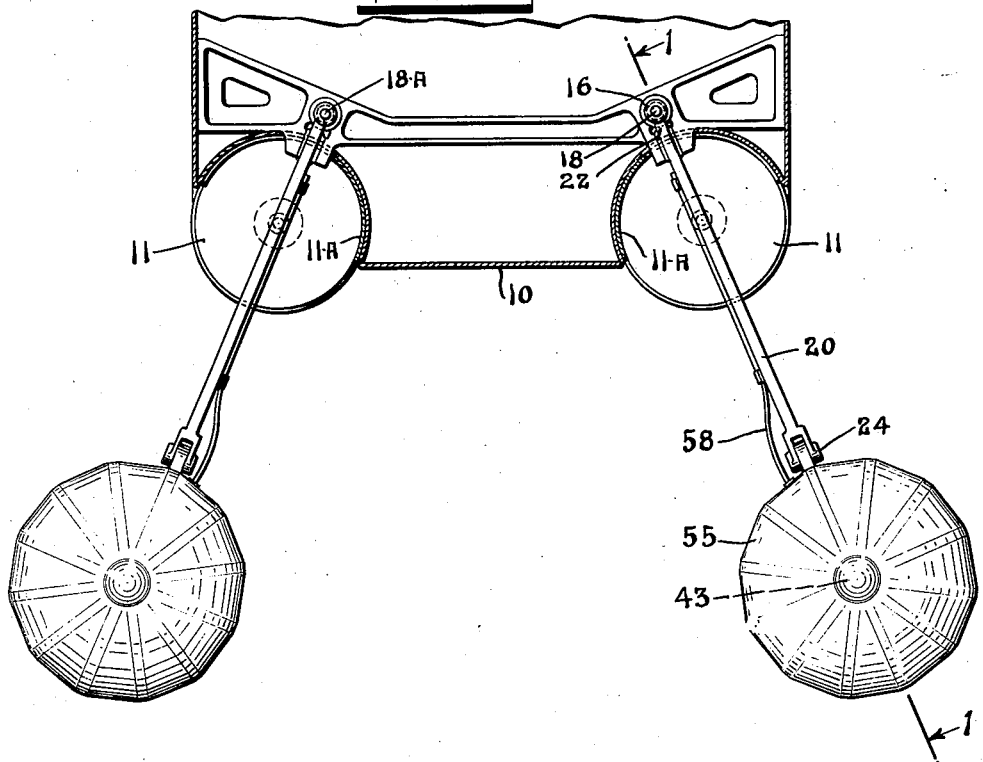
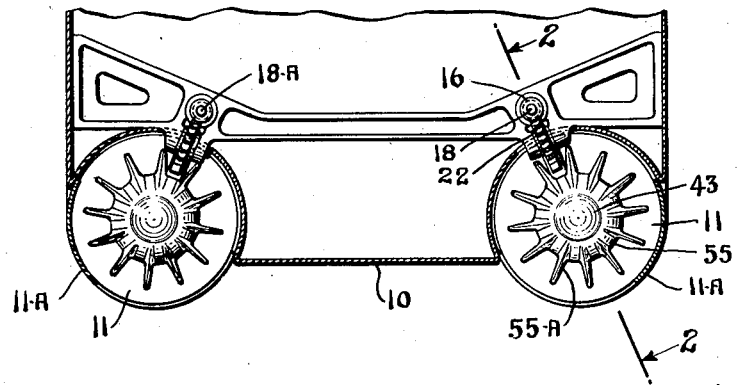
INVENTOR.
Bertell W. King
BY
Marshall & Hanley
ATTORNEYS Dec. 22, 1942. B. W. KING 2,306,269
RETRACTABLE AND COLLAPSIBLE PONTOON
Filed Jan. 27, 1940 7 Sheets-Sheet 3
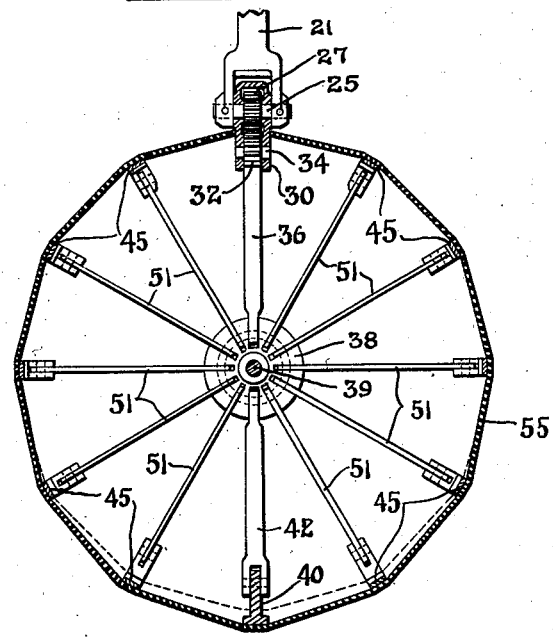
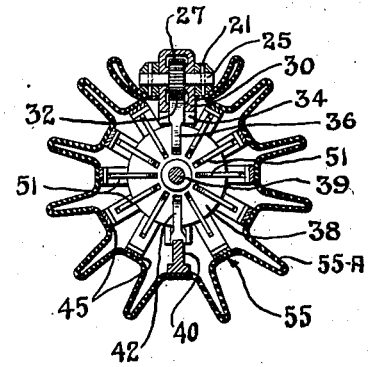
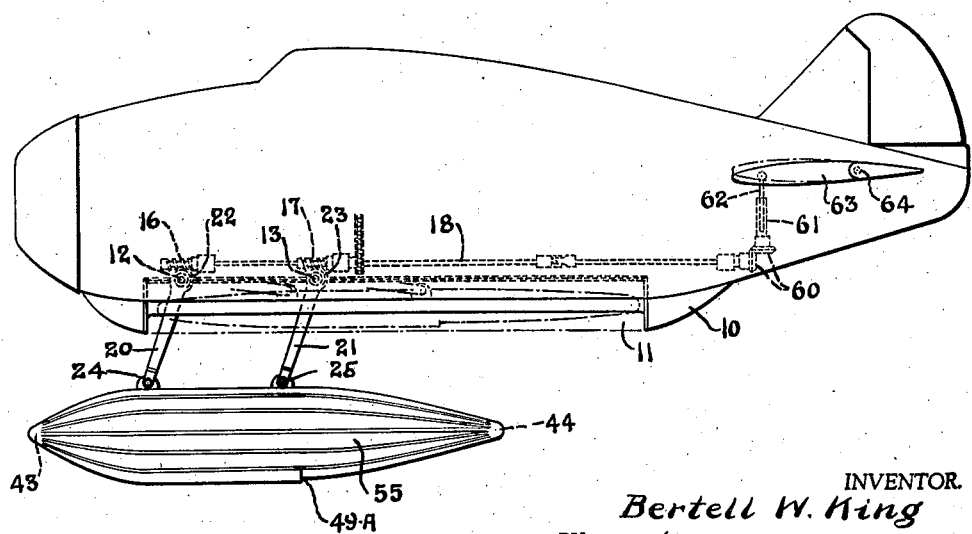
INVENTOR.
Bertell W. King Dec. 22, 1942.　　　　B. W. KING　　　　2,306,269
RETRACTABLE AND COLLAPSIBLE PONTOON
Filed Jan. 27, 1940　　　　7 Sheets-Sheet 4
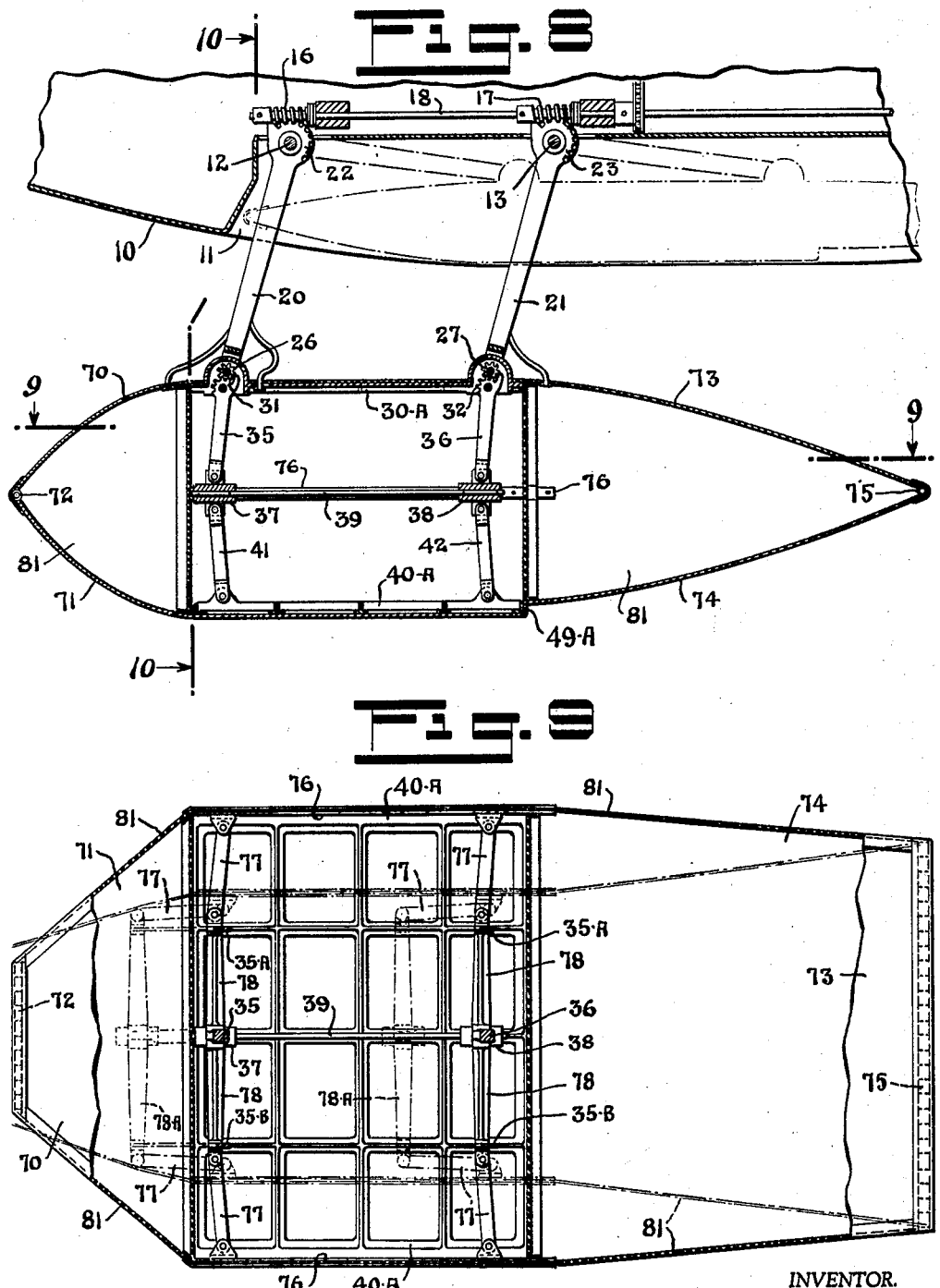

Dec. 22, 1942.  B. W. KING  2,306,269
RETRACTABLE AND COLLAPSIBLE PONTOON
Filed Jan. 27, 1940  7 Sheets-Sheet 5
Fig.10
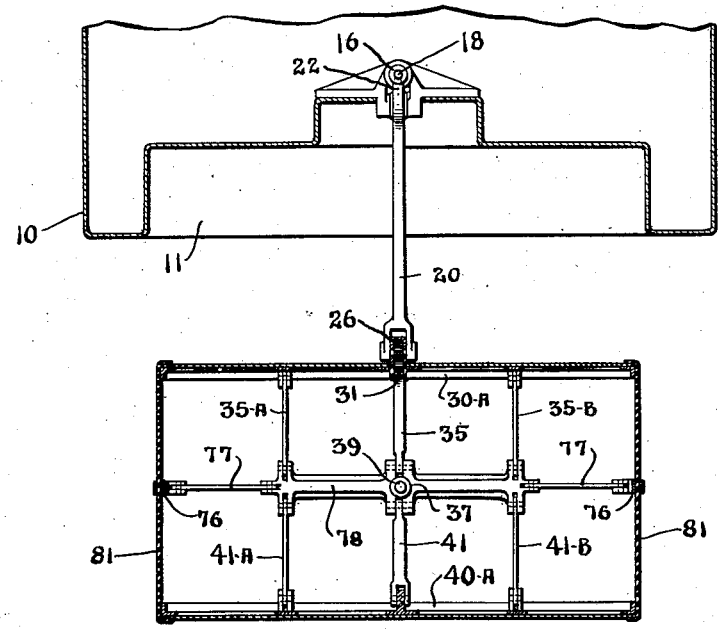
Fig.10-A
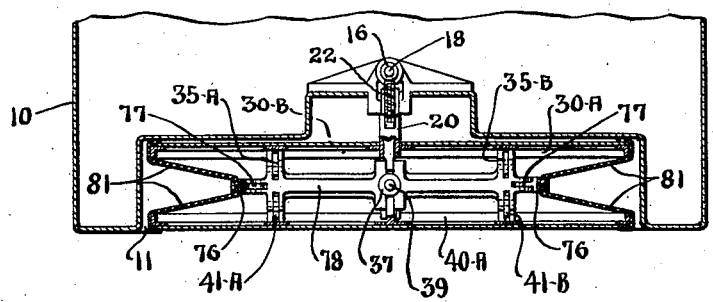
INVENTOR.
Bertell W. King
BY
ATTORNEYS Dec. 22, 1942. B. W. KING 2,306,269
RETRACTABLE AND COLLAPSIBLE PONTOON
Filed Jan. 27, 1940 7 Sheets-Sheet 6

INVENTOR.
Bertell W. King
BY Marshall & Hawley
ATTORNEYS

Dec. 22, 1942.  B. W. KING  2,306,269
RETRACTABLE AND COLLAPSIBLE PONTOON
Filed Jan. 27, 1940  7 Sheets-Sheet 7

INVENTOR.
Bertell W. King
BY
ATTORNEYS

Patented Dec. 22, 1942

2,306,269

UNITED STATES PATENT OFFICE 2,306,269

RETRACTABLE AND COLLAPSIBLE PONTOON

Bertell W. King, Brooklyn, N. Y.

Application January 27, 1940, Serial No. 315,870

11 Claims. (Cl. 244—102)

This invention relates to improvements in retractable and collapsible pontoons, suitable for landing gears for aeroplanes and other uses, and its object is to provide a simple construction for such devices and mechanism for operating it.

A pontoon for an aeroplane other than a wing pontoon must be of sufficient size to have enough buoyancy to sustain the weight of the plane to which it is attached and when two pontoons are used it is required that each of them shall have enough buoyancy to sustain the entire weight of the plane. Consequently, they are too large to be moved up into the fuselage or other rigid part of the plane.

Collapsible pontoons affixed to aeroplanes have been proposed which can be inflated to project beyond a fuselage, but these do not meet the need of a suitable landing gear in which the pontoon when in use must be below and sufficiently spaced from the fuselage or frame of the aeropane to hold the propeller above the water. It is an object of this invention to meet this need by providing a landing gear which comprises a collapsible pontoon supported on movable arms pivotally mounted on a suitable part of an aeroplane with folding mechanism actuated by the movement of the arms. By this arrangement the cross-sectional size of the pontoon when it is below and spaced from the fuselage or frame of the aeroplane is great enough to provide the necessary buoyancy and when it is raised by the movement of the supporting arms it is folded transversely into such a size that it may enter a comparatively small space provided for its reception in the fuselage or other suitable part of the aeroplane structure, thus eliminating air resistance.

These and other objects of the invention will appear in the following specification in which I will describe certain mechanisms which embody and illustrate the invention, the novel features of which will be set forth in appended claims.

Referring to the drawings,

Fig. 1 is a sectional elevation of a landing gear which is made according to and embodies my invention, the parts being shown in position to effect a landing, the section being taken on line 1—1 of Fig. 3;

Fig. 2 is a similar view of the same parts with the pontoon retracted and folded. This section is taken on the line 2—2 of Fig. 4;

Fig. 3 is a front elevation, partly in section, of the parts shown in the preceding figures in the positions in which they are shown in Fig. 1;

Fig. 4 is a view similar to Fig. 3 with the parts in the position in which they are shown in Fig. 2;

Fig. 5 is a cross sectional front elevation of the pontoon shown in Fig. 1, the section being taken on the line 5—5 of the latter figure;

Fig. 6 is a view similar to Fig. 5 with the parts retracted and folded, the section being taken on the line 6—6 of Fig. 2;

Fig. 7 is a side elevation of an aeroplane equipped with a pontoon which embodies this invention, provided with an arrangement for maintaining the balance of the plane when the position of the pontoon is shifted;

Fig. 8 is a sectional side elevation of another form of landing gear which also embodies my invention, the parts being shown in position to effect a landing;

Fig. 9 is a sectional plan view of the pontoon shown in Fig. 8, the section being taken on the line 9—9 of the latter figure;

Figs. 10 and 10A are sectional front elevations of the form of pontoon which is shown in Figs. 8 and 9, the section in Fig. 10 being taken on the line 10—10 of Fig. 8, showing the parts in landing condition and in Fig. 10A the same parts are shown in retracted and folded condition;

Like characters of reference designate similar parts in the various figures of the drawings.

Figure 11:
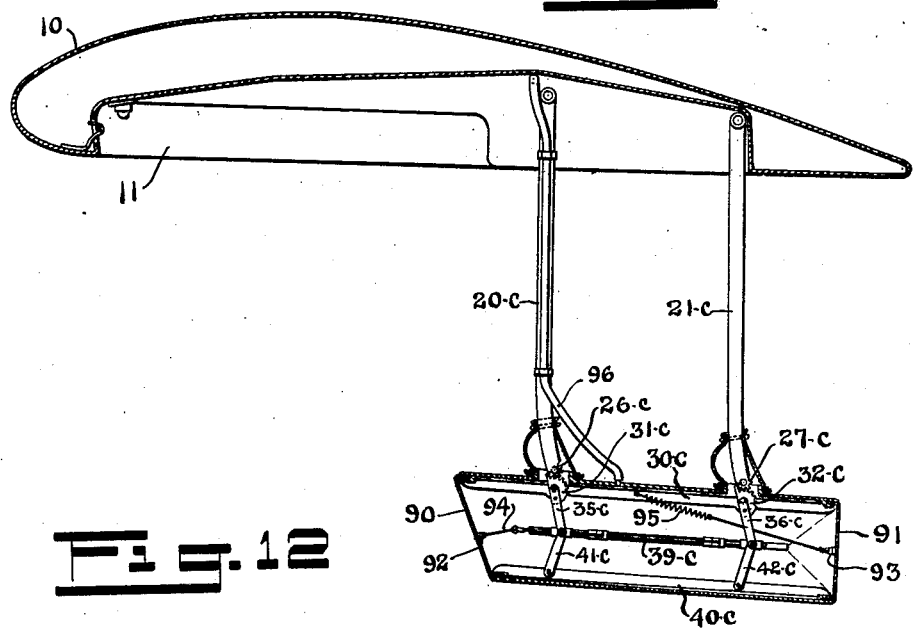
Figs. 11 and 12 are sectional side elevations of another modified embodiment of my invention, showing a pontoon and associated parts in landing condition in Fig. 11 and in retracted and folded condition in Fig. 12.
Figure 12:
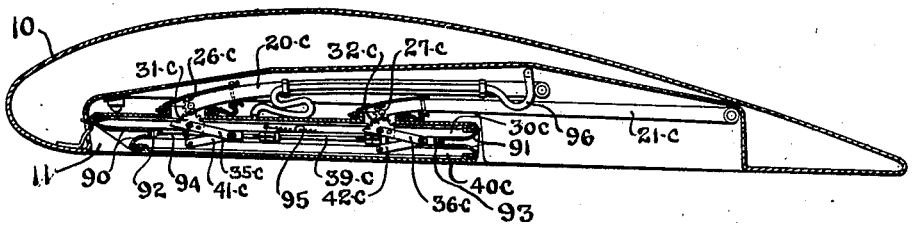
Figures 13, 14:
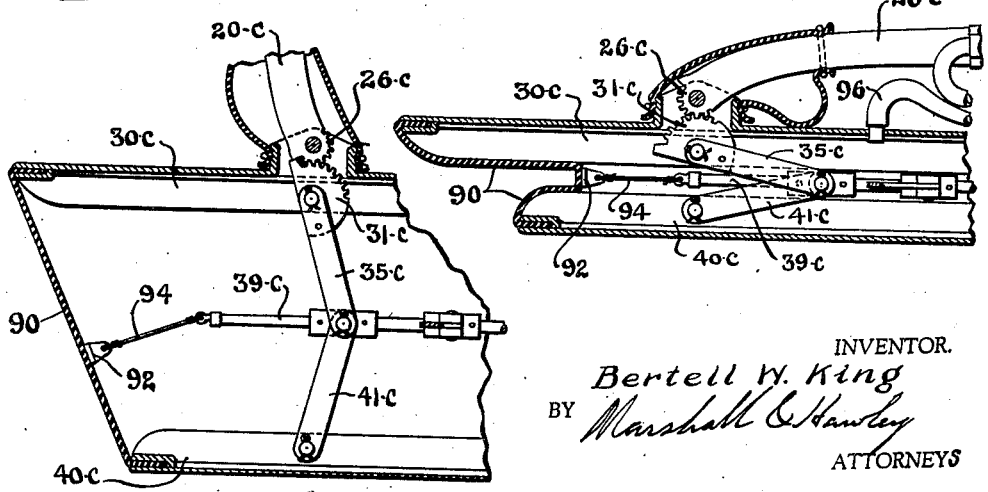
Figs. 13 and 14 are sectional side elevations on an enlarged scale of some of the parts shown in Figs. 11 and 12, respectively.

10 designates a rigid part of an aeroplane structure in which semi-circular, longitudinal pockets 11 are formed. 12 and 13 are longitudinally spaced transverse shafts pivotally supporting retracting arms 20 and 21, respectively. Affixed to or integral with the upper ends of these arms are segmental worm gears 22 and 23 engaging worms 16 and 17 on a shaft 18 actuated by hand or by suitable mechanism not shown. By this mechanism, shown somewhat diagrammatically, the arms 20, 21 may be moved from their distended position shown in Figs. 1 and 3 to their retracted position shown in Figs. 2 and 4, and vice versa.

Near the other ends of these supporting arms they are pivoted at 24 and 25 to a rigid bar 30 which forms the upper part of the main body of a pontoon frame. Affixed to or integral with the supporting arms are gears 26, 27 which mesh with gears 31, 32 pivoted to the bar 30 at 33, 34 and affixed to arms 35, 36. The other ends of arms 35, 36 are pivoted to collars 37, 38 spaced apart and affixed to a rod 39 which is parallel with the bar 30 and disposed substantially in the central longitudinal axis of the pontoon.

40 is a rigid bar which forms the bottom of the main body of the pontoon. This is connected to the collars 37, 38 by arms 41, 42 which are pivoted to both the bar and the collars.

The pontoon itself comprises two heads 43, 44 which are interconnected by a plurality of angularly spaced resilient strips 45. Strips 46, 47 extend from the ends of the bar 30 to the heads 43, 44 respectively, and strips 48, 49 extend from the bar 40 to the heads 43, 44. A step 49A is formed near the connection of strips 49 and bar 40 to facilitate planing of the pontoon when moving through water and raising the pontoon from the water as the plane rises.

A plurality of radially disposed arms 50 extend from the collar 37 to the strips 45. These arms are pivoted near their ends to the collar and to the strips. 51 designates similar radial arms between the collar 38 and the strips 45. When the collars 37, 38 are in their extreme right hand position, as seen in Fig. 1, the frames 30 and 40 are moved apart and so are the strips 45.

The skeleton frame thus formed is covered by a waterproof envelope 55, preferably of somewhat elastic material. 56, 57 are transverse diaphragms connected with the central rod 39 and the outer envelope 55 dividing the pontoon into a plurality of water-tight compartments. 58 designates air tubes which run from these compartments to points well above the top of the pontoon in its distended position. These tubes may be placed alongside of the arms 20, 21, as shown, or, if desired, may run through these arms.

It may be seen that the pontoon shown in Fig. 1 is in proper spaced relation to the part 10 of the aeroplane to which it is attached, to function properly for landing. The front view, Fig. 3, shows two such properly positioned pontoons. The shafts 18 and 18A may be interconnected if desired by suitable mechanism to insure their moving in unison.

It is, of course, desirable to retract the pontoons when they are not in use. This is done by turning the shaft 18 in the direction to swing the supporting arms 20, 21 to the right, as viewed in Fig. 1. This, through the interconnection of gears 26, 27 with gears 31, 32, will move the arms 35, 36 and rod 39 to the left and this folds up the skeleton frame so that when it reaches the pocket 11 it is small enough to go into it, as shown in Figs. 2 and 4. The envelope 55 will then assume some such position as that indicated at 55A (Figs. 4 and 6).

To lower and distend the pontoon, the operation is reversed.

When the position of the pontoon is shifted, as thus described, the balance of the plane is disturbed. This difficulty may be overcome automatically by such an arrangement as that shown in Fig. 7. In this case the shaft 18 is geared at 60 to rotate an internally threaded vertically disposed member 61 in which is a non-rotative screw 62. The upper end of this screw is connected to an elevation fin 63 which is pivoted to the body of the plane at 64, a point spaced from the connection of the screw with the fin. When the pontoon is in landing position the fin 63 will be in its full line position. When the pontoon is retracted the fin will be in its dotted line position. These parts may be proportioned to maintain the balance of the plane regardless of the position of the pontoon.

The pontoon shown in Figs. 8 and 9 comprises two substantially flat rigid members 30A and 40A connected to the arms 35, 41 and 36, 42 arranged to be moved toward and away from each other by the movement of the arms 20, 21. Plates 70, 71 of resilient sheet metal extend from the members 30A, 40A to a line 72 where they are hinged or otherwise connected. At the other end are similar plates 73, 74 joined at the line 75.

In substantially horizontal alinement with the members 30A, 40A are side strips such as those shown at 76 in Figs. 8, 9 and 10. When the pontoon is distended these side strips are forced outwardly by arms 77, 77 pivoted to the side strips and to transverse arms 78, 78 which extend from the collars 37, 38. When the rod 39 is moved to the left to move the members 30A, 40A toward each other, the arms 78 are moved to the dotted line positions 78A, 78A, (Fig. 9).

Figs. 10 and 10A illustrate a pontoon of simple construction associated with the caracel of an aeroplane. In this case the pontoon comprises two substantially flat rectangular members 30B and 40B moved toward and from each other by the pivoted arms 35, 41 and by supplemental arms 35A, 41A and 35B, 41B pivoted to the arms 78 which extend from and move with the collars 37 and 38. 81 designates flexible material interconnecting the sides of the members 30B, 40B. The strips 76, 76 are connected to these sides 81 intermediate the members 30B and 40B. Between the strips 76 and the arms 78 are pivoted the arms 77 arranged to draw the sides inwardly when the pontoon is collapsed, as shown in Fig. 10A. It is understood that the ends of the members 30B, 40B are also connected by flexible waterproof material.

Referring now to Figs. 11–14, the pontoon shown is an air tight structure comprising rigid top and bottom members 30C, 40C connected to a longitudinally movable rod 39C by links 35C, 41C and 36C, 42C. On the upper ends of the links 35C, 36C are segmental gears 31C, 32C in mesh with gears 26C, 27C on the ends of arms 20C, 21C. Between the ends of the members 30C, 40C are flexible sheets 90, 91. 92, 93 are rigid bars. The bar 92 is connected to the rod 39C as by a wire 94, to draw in the sheet 90 when the rod is moved to the right. The bar 93 is connected to the member 30C through a spring 95 so that the sheet 91 is drawn in when the members 30C and 40C are brought together.

In this case the parts are actuated penumatically. 96 is a tube connected with the inside of the air tight pontoon. When air is exhausted from the pontoon through the tube 96 it will collapse and the movement of the member 40C toward the member 30C will force a rod 39C to the right, causing the arms 35C, 41C and 36C, 42C to fold to the positions shown in Figs. 12 and 14. The movement of the arms 35C and 36C will be imparted to the arms 20C, 21C through their geared connection to retract the pontoon.

This operation will be reversed upon the admission of air under pressure to the pontoon through the tube 96.

Figure 15:
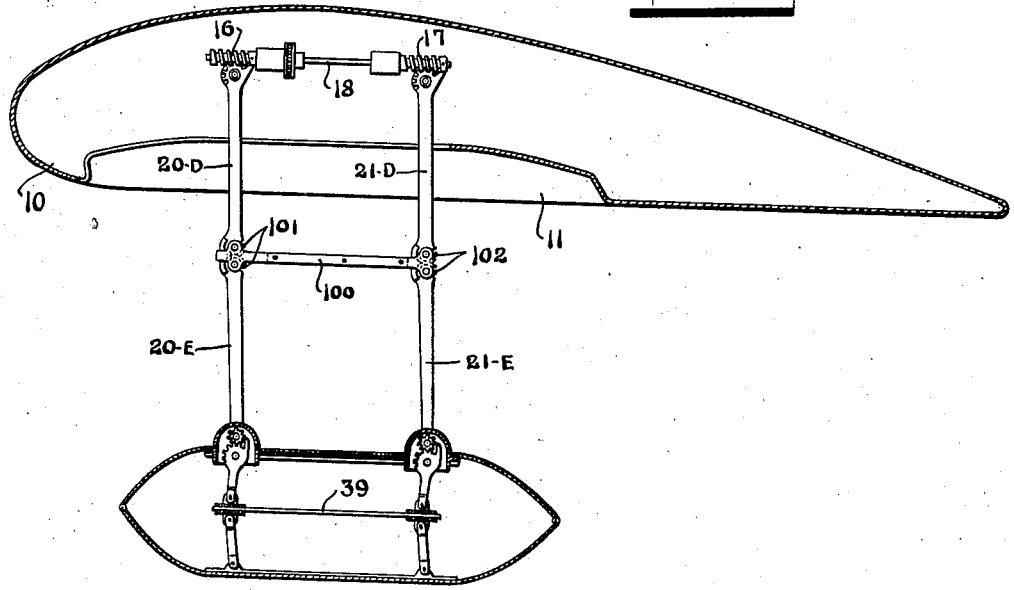
Figs. 15 and 16 are sectional side elevations of another form of pontoon with a different form of retracting mechanism, these figures also showing the parts in landing and in retracted and folding conditions, respectively.
Figure 16:
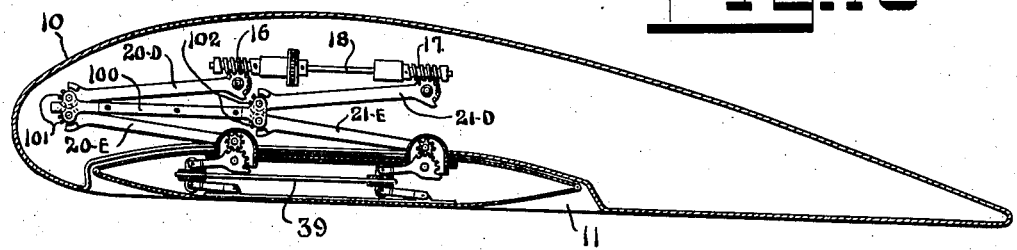

Figs. 15 and 16 illustrate a modification of the retracting mechanism. The arms 20D, 21D are actuated by the rotation of shaft 18, as in the arrangement shown in Figs. 1–10A. In this case their lower ends are pivoted to a horizontal frame 100, to which extension arms 20E, 21E are also pivoted. Adjacent ends of arms 20D, 20E and of arms 21D, 21E are geared together, as at 101, 102, so that when arms 20D, 21D are swung to the left, the extension arms 20E, 21E will be swung to the right. The lower ends of the extension arms are connected to the pontoon expanding mechanism in the manner described previously.

The pockets into which the pontoon is retracted may be closed, if desired, when the pontoon is within it. As an example of a pocket closing device, the pocket 11 shown in Figs. 1-4 is circular in cross-section and is provided with a shield or shutter 11A which may be rotated to close the pocket, as shown in Fig. 4.

Several different constructions have been illustrated and described in order to show that the invention is not limited to any specific arrangement of parts and I intend no limitations other than those imposed by the appended claims. The invention has been described as a landing gear for aeroplanes, but obviously is not limited to such use. Portable bridge units for military purposes and life rafts for marine use are examples of other uses.

What I claim is:

1. A rigid body, a contractable pontoon, contracting and expanding toggle mechanism within the pontoon, supporting arms pivotally connected to the body and to the pontoon, means for swinging the arms to move the pontoon toward and away from said body, and gearing interconnecting the arms and the toggle mechanism whereby said toggle mechanism is actuated by the movement of the arms.

2. A rigid body, a pontoon comprising a contractible frame and a flexible waterproof cover, a transverse flexible diaphragm dividing the pontoon into separate compartments, contracting and expanding toggle mechanism within the frame, supporting arms pivotally connected to the body and to said frame, means for swinging the arms to move the pontoon toward and away from the body and gearing interconnecting the arms and the toggle mechanism whereby said toggle mechanism is actuated by the movement of the arms.

3. A rigid body, a pontoon comprising a contractible frame and a flexible waterproof cover, arms pivotally connected to the body, toggle mechanism interconnecting the arms and said frame, and means for swinging the arms and thereby actuating said mechanism.

4. A rigid body constructed with a pontoon receiving space, a pontoon, arms pivoted near one of their ends to said body, the other ends of the arms being pivoted to the pontoon, said arms being arranged to hold the body and the pontoon in spaced relation, means for swinging the arms to bring the pontoon into the space in the body, and toggle mechanism within the pontoon actuated by the movement of the arms for contracting the pontoon.

5. A rigid body, a pontoon, swinging arms pivoted near one of their ends to the body and pivoted near the other of their ends to the pontoon, said arms being arranged to hold the body and the pontoon in spaced relation, means for swinging the arms to move the pontoon toward the body, said pontoon having a contractible frame comprising a longitudinally movable rod, a plurality of longitudinal members angularly disposed around said rod, a plurality of links interconnecting the rod and said members and a flexible waterproof cover, and means for causing the swinging movement of the arms to impart a longitudinal movement to the rod.

6. A rigid body constructed with a pontoon receiving space, a pontoon, swinging arms pivoted near one of their ends to the body and pivoted near the other of their ends to the pontoon, said arms being arranged to hold the body and the pontoon in spaced relation, means for swinging the arms to move the pontoon into the space in the body, said pontoon having a contractible frame comprising a longitudinal movable rod, a plurality of longitudinal members angularly disposed around said rod, a plurality of links interconnecting the rod and said members and a flexible waterproof cover, and gearing between the swinging arms and some of the links arranged to cause the swinging movement of the arms to impart a longitudinal movement to the rod.

7. A rigid body, a pontoon, a pair of spaced swinging arms pivoted near one of their ends to the body and pivoted near the other of their ends to the pontoon, said arms being arranged to hold the body and the pontoon in spaced relation, means for swinging the arms to move the pontoon toward the body, said pontoon having a contractible frame comprising a longitudinally movable rod, a plurality of longitudinal members angularly disposed around said rod, a plurality of links interconnecting the rod and said members and a flexible waterproof cover, and gearing between the swinging arms and some of the links arranged to cause the swinging movement of the arms to impart a longitudinal movement to the rod.

8. A rigid body, a pontoon comprising a contractible frame and a flexible waterproof cover, a transverse flexible diaphragm dividing the pontoon into separate compartments expanding toggle mechanism within the frame, arms pivotally connected to the body, toggle mechanism interconnecting the arms and said frame, means for swinging the arms and thereby actuating said mechanism, and an air tube extending upwardly from each compartment.

9. A rigid body, a pontoon movably connected to said body, means for moving the pontoon toward and away from the body and toggle-mechanism within the pontoon actuated by said movement for contracting and expanding the pontoon, said pontoon having a lower rigid portion arranged to form a step.

10. A rigid body, a pontoon comprising rigid upper and lower members, an intermediate longitudinally movable rod and pairs of links interconnecting said members and rod, swinging arms pivoted to the body and to said upper member, gearing between said arms and some of said links for causing the movement of the arms to move the rod and to change the relative position of the members.

11. A rigid body constructed with a pontoon receiving space, a pontoon, arm pivoted near one of their ends to said body, the other ends of the arms being pivoted to the pontoon, said arms being arranged to hold the body and the pontoon in spaced relation, means for swinging the arms to bring the pontoon into the space in the body, means for closing said space, and toggle mechanism within the pontoon actuated by the movement of the arms for contracting and expanding the pontoon.

BERTELL W. KING.